United States Patent [19]

Henke et al.

[11] Patent Number: 4,696,520

[45] Date of Patent: Sep. 29, 1987

[54] RUNNING WHEEL FOR TRACK VEHICLES

[75] Inventors: Klaus Henke, Dortmund; Johannes Wozniak, Lippstadt, both of Fed. Rep. of Germany

[73] Assignee: Hoesch Aktiengesellschaft, Fed. Rep. of Germany

[21] Appl. No.: 844,852

[22] Filed: Mar. 27, 1986

[30] Foreign Application Priority Data

May 3, 1985 [DE] Fed. Rep. of Germany ....... 3515918

[51] Int. Cl.$^4$ .......................... B60B 3/04; B62D 55/08
[52] U.S. Cl. .................................... 301/63 DS; 305/28
[58] Field of Search ............... 152/5, 12, 323, 48; 301/63 R, 63 DD, 63 DS, 95, 97; 305/21, 28, 56

[56] References Cited

U.S. PATENT DOCUMENTS 2,692,801 10/1954 Rosenberg ..................... 152/323 X
2,701,971 2/1955 Carter et al. .................... 152/323 X

FOREIGN PATENT DOCUMENTS 1027542 4/1958 Fed. Rep. of Germany ...... 152/323
1201693 9/1965 Fed. Rep. of Germany ........ 305/56
2733307 2/1979 Fed. Rep. of Germany ........ 305/21
 403505 6/1966 Switzerland ........................ 152/323

Primary Examiner—David A. Scherbel

[57] ABSTRACT

In a running wheel for track vehicles comprising two discs (1) which leave free a guide gap (11) for the chain teeth (10) and which terminate in a cylindrical region (2) with rubber coating (3) disposed at the outer periphery, to reduce the material stresses in each case in the transition between cylindrical region (2) and disc (1) due to the introduced forces at the open end of the cylindrical region (2) with constant wall thickness, in the third of the cylindrical region (2) remote from each disc (1) an inwardly directed peripheral bead (4) is disposed.

4 Claims, 1 Drawing Figure

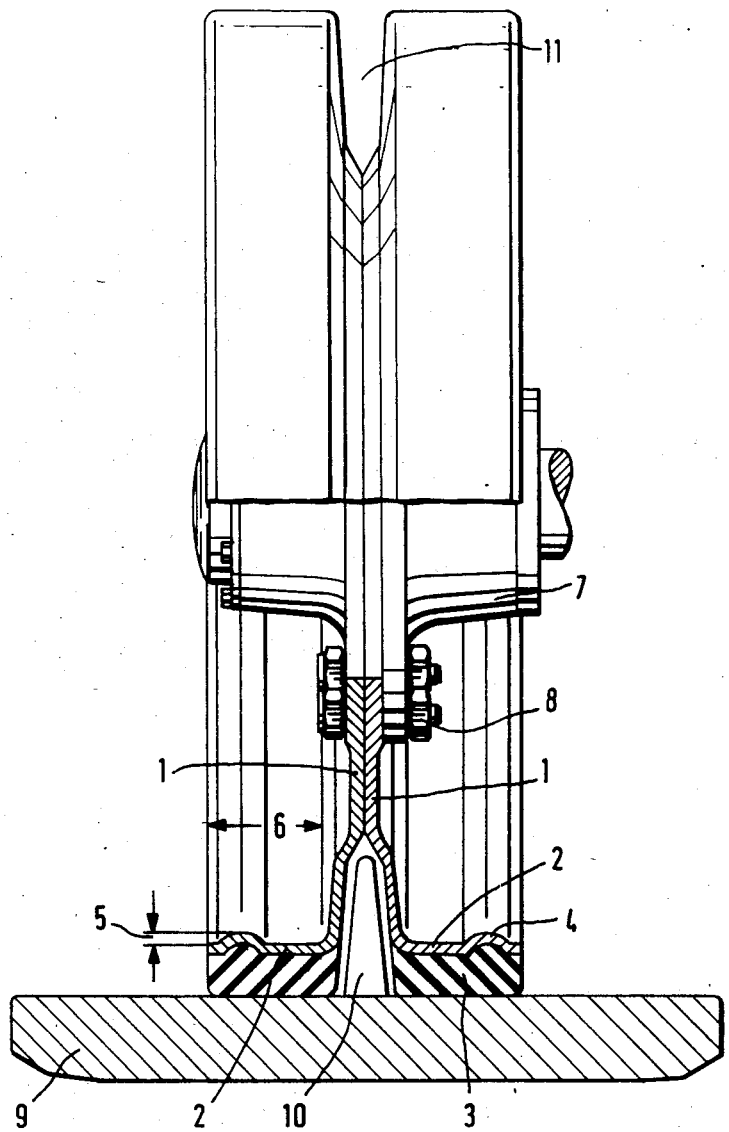

RUNNING WHEEL FOR TRACK VEHICLES

The invention relates to a running wheel for track vehicles comprising two discs which leave free a guide gap for the chain teeth and which terminate in a cylindrical region, with a rubber coating disposed at the outer periphery.

Such running wheels serve in the contact region of the track to transmit the contact force of the track vehicle to the track and guide the track over the track teeth.

Such a running wheel is known from DE-AS No. 1,201,693. A disadvantage with the known running wheel is that the forces applied at the open end of the cylindrical portion lead to an excessive bending moment in the transition between the cylindrical portion and the disc of the running wheel. To overcome this disadvantage an embodiment according to DE-OS No. 2,733,307 proposes reinforcing the running wheel with a welded band or tire. A disadvantage in this embodiment is the resulting extremely corrosion-prone cavity between the band and the running wheel body. In addition the weld seams impair the material properties of the high-quality material making a heat treatment necessary.

The problem underlying the invention is thus to reduce the material stresses in the transition between each cylindrical region and the disc due to the forces introduced at the open end of the cylindrical region with the same wall thickness.

This problem is solved according to the invention in that in the third of the cylindrical region remote from each disc an inwardly directed peripheral bead is disposed.

In an advantageous embodiment the peripheral bead has a depth of ⅛ to 1/15 of the cylinder height. Expediently, the peripheral bead is made by cold forming.

If it is assumed that the wall thickness of the previously known running wheel constructions is so dimensioned that by the increased tension in the transition between cylindrical region and disc no excessive stressing of the material occurred, the construction according to the invention can provide a reduction of the total wall thickness of the running wheel. Apart from improved economy this also leads to a reduction in weight of the running wheel.

As part of the unsprung masses of the running gear such a reduction in weight has an extremely advantageous effect on the overall chassis construction and thus on the road holding of the track vehicle.

By cold forming of the bead in this region a work hardening of the material is achieved and this contributes in particular to improving the dimensional stability.

An example of embodiment of the invention is illustrated in the drawings and will be described in detail hereinafter.

The drawing shows a partial section through a running wheel in combination with a track chain link.

The running wheel is made up of two discs 1 which leave free a guide gap 11 for the chain teeth 10 of a crawler track 9. The discs 1 each terminate in a cylindrical region 2. In the third of the cylindrical region 2 remote from each disc 1 there is an inwardly directed peripheral bead 4. Over the entire cylindrical region 2 at the outer periphery a rubber coating 3 is applied, for example by vulcanizing. The running wheel consisting of two parts is secured to the running wheel mounting 7 by screw connections 8. In the example of embodiment shown the peripheral bead has a depth 5 of 1/15 of the cylinder height 6. The cooperation of the running wheel with the crawler track link 9 is clearly apparent. The guiding of the track link is by the guide tooth 10 disposed in the guide gap 11 of the running wheel.

I claim:

1. A running wheel for track vehicles comprising two similar discs attached in back-to-back relationship and defining therebetween a radially extending guide gap for track teeth, each of said discs having a substantially axially extending outer annular surface, a hollow tubular rubber coating disposed about the outer annular surface of each disc, the axially outer third of the outer annular surface of each disc including a radially inwardly directed annular stiffening bead, and each rubber coating having a complimentary annular bead entered in its annular disc bead to retain the coatings against relative axial displacement.

2. A running wheel according to claim 1, characterized in that the peripheral bead (4) has a depth (5) of ⅛ to 1/15 of the cylinder height (6).

3. A running wheel according to claim 2, characterized in that the peripheral bead (4) is made by cold working.

4. A running wheel according to claim 1, characterized in that the peripheral bead (4) is made by cold working.

* * * * *